US008924685B2

(12) United States Patent
Sartorius

(10) Patent No.: US 8,924,685 B2
(45) Date of Patent: Dec. 30, 2014

(54) CONFIGURING SURROGATE MEMORY ACCESSING AGENTS USING NON-PRIVILEDGED PROCESSES

(75) Inventor: Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 12/777,324

(22) Filed: May 11, 2010

(65) Prior Publication Data

US 2011/0283083 A1    Nov. 17, 2011

(51) Int. Cl.
  *G06F 12/10*    (2006.01)
  *G06F 9/34*    (2006.01)
  *G06F 9/35*    (2006.01)

(52) U.S. Cl.
  CPC .............. *G06F 9/34* (2013.01); *G06F 12/1081* (2013.01); *G06F 9/35* (2013.01); *G06F 12/1027* (2013.01)
  USPC ................................ 711/207; 710/22; 710/26

(58) Field of Classification Search
  USPC ........................................... 711/203, E12.058
  See application file for complete search history.

(56) References Cited

U.S. PATENT DOCUMENTS

| 5,481,688 | A * | 1/1996 | Takagi ........................... 711/208 |
| 6,662,289 | B1 * | 12/2003 | Ang ............................... 711/202 |
| 2002/0152428 | A1 * | 10/2002 | James et al. ..................... 714/42 |
| 2004/0162961 | A1 * | 8/2004 | Lyon .............................. 711/207 |
| 2005/0138235 | A1 * | 6/2005 | Ali Khan et al. ................ 710/24 |
| 2006/0168365 | A1 * | 7/2006 | Martinez et al. ................ 710/22 |
| 2008/0222383 | A1 * | 9/2008 | Spracklen et al. ............. 711/207 |
| 2010/0223447 | A1 * | 9/2010 | Serebrin ....................... 712/225 |

FOREIGN PATENT DOCUMENTS

| CN | 1896972 A | 1/2007 |
| CN | 101556565 A | 10/2009 |
| JP | H05216809 A | 8/1993 |
| JP | 2007087177 A | 4/2007 |

OTHER PUBLICATIONS

International Search Report and Written Opinion—PCT/US2011/034095, ISA/EPO—Jul. 7, 2011.
Taiwan Search Report—TW100116570—TIPO—Feb. 20, 2014.

* cited by examiner

*Primary Examiner* — Kaushikkumar Patel
(74) *Attorney, Agent, or Firm* — Nicholas J. Pauley; Peter Michael Kamarchik; Joseph Agusta

(57) ABSTRACT

Configuring a surrogate memory accessing agent using an instruction for translating and storing a data value is described. In one embodiment, the instruction is received that includes a first operand specifying a data value to be translated and a second operand specifying a virtual address associated with a location of a surrogate memory accessing agent register in which to store the data value. The data value can be translated to a first physical address. The virtual address can be translated to a second physical address. The first physical address is stored in the surrogate memory accessing agent register based on the second physical address.

9 Claims, 9 Drawing Sheets

CONFIGURING SURROGATE MEMORY ACCESSING AGENTS USING NON-PRIVILEDGED PROCESSES

FIELD OF THE DISCLOSURE

Embodiments of the inventive concepts disclosed herein relate generally to the field of data processing systems. More particularly, embodiments of the inventive concepts disclosed herein relate to using instructions for translating and storing data values to configure surrogate memory accessing agents.

BACKGROUND

Data processing systems can include various components that interact with each other to process an instruction. One component may be a surrogate memory accessing agent that can manage values stored in physical memory. An example of a surrogate memory accessing agent is a direct memory access (DMA) channel. A surrogate memory accessing agent may be used to access memory, such as for performing a calculation on a value stored in memory or change the location of a value in physical memory by causing the value to be copied or moved to a second location in physical memory. For example, a surrogate memory accessing agent can include two registers. One register can store a data value that is the physical address of the memory location of the memory value to be moved or copied. The other register can store a data value that is the physical address of the memory location to which the memory value is moved or copied. Subsequently, such as when the registers are filled with data values, the surrogate memory accessing agent can provide the data values from the registers to cause the memory value in a physical memory location to be moved or copied.

Surrogate memory accessing agents are configured by software executed by a processor, such as by storing, in a register of a surrogate memory accessing agent, a data value that is the physical address of a location in memory to be accessed. The physical address represented by the data value is received by the surrogate memory accessing agent from a processor operating in a privileged mode and executing a STORE instruction. The STORE instruction specifies a physical address represented by a data value to be stored in a register identified by a specified address of the register. The processor operates in a privileged mode to access, obtain, and write the physical address. A processor operating in a non-privileged mode does not have access to physical addresses to protect the integrity of the physical addresses.

If the processor is operating in a non-privileged mode, it first suspends execution of the non-privileged process and switches to a privileged mode. Once in the privileged mode, the processor then determines the physical address of the location in memory to be accessed and that is represented by the data value. The data value representing the physical address is stored in a register of the surrogate memory accessing agent.

Suspending execution may introduce inefficiencies in processing and consume power. Accordingly, systems and processes for configuring surrogate memory accessing agents are desirable that can decrease processing delays, power consumption, and/or otherwise provide more efficient processing. Furthermore, it is desirable to configure surrogate memory accessing agents without requiring a processor to operate in a privileged mode, but protect physical addresses from being exposed to operations in non-privileged modes.

SUMMARY OF THE DISCLOSURE

In an embodiment, an instruction is received that includes a first operand specifying a data value to be translated and a second operand specifying a virtual address associated with a location of a surrogate memory accessing agent register in which to store the data value. The data value can be translated to a first physical address. The virtual address can be translated to a second physical address. The first physical address is stored in the surrogate memory accessing agent register based on the second physical address.

This illustrative embodiment is mentioned not to limit or define the inventive concepts disclosed herein, but to provide examples to aid understanding thereof. Other aspects, advantages, and features of the present disclosure will become apparent after review of the entire application, including the following sections: Brief Description of the Drawings, Detailed Description, and the Claims.

BRIEF DESCRIPTION OF THE DRAWINGS

These and other features, aspects, and advantages of the present inventive concepts disclosed herein are better understood when the following Detailed Description is read with reference to the accompanying drawings, wherein.

DETAILED DESCRIPTION

Figure 1:
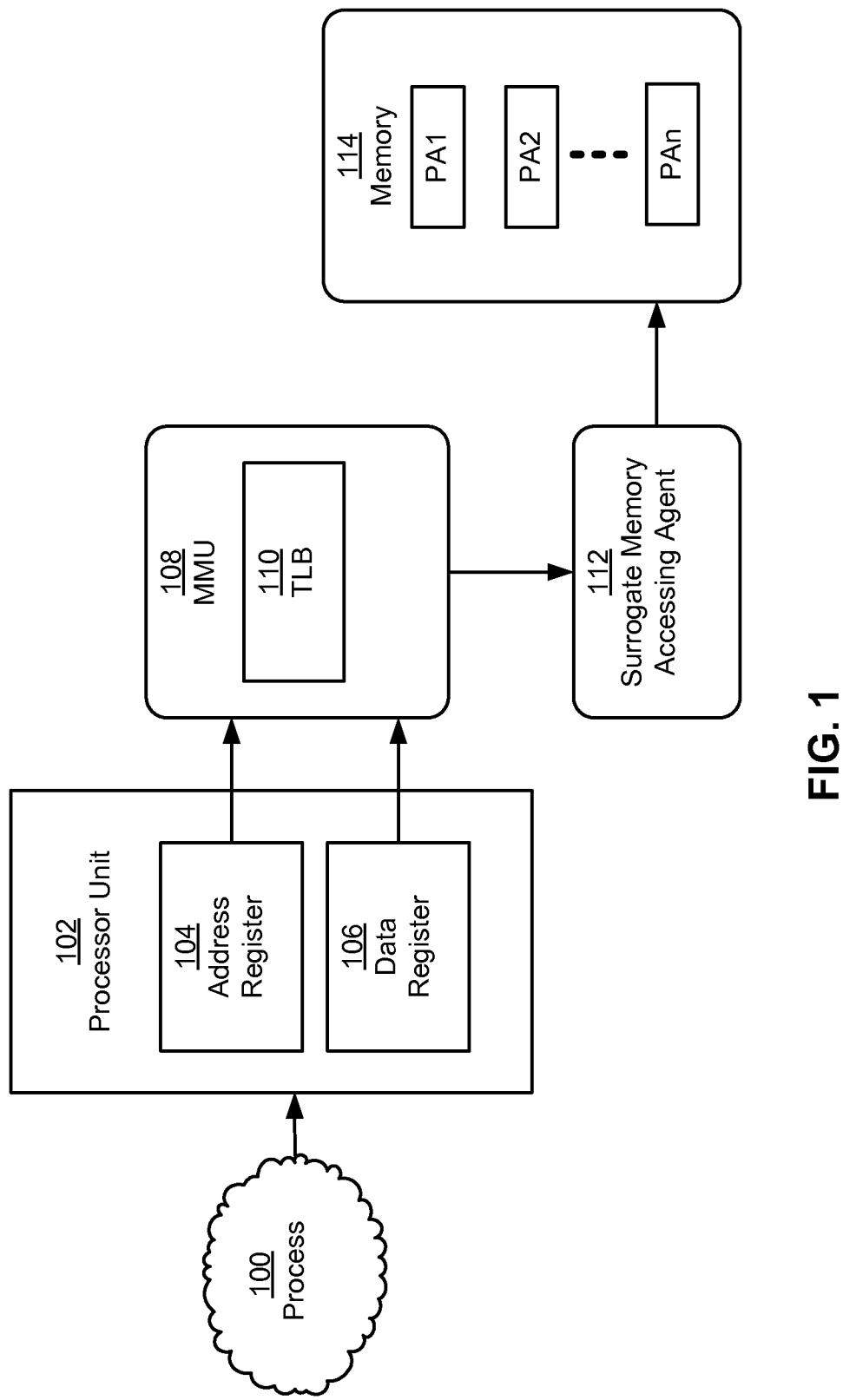
FIG. 1 is a general diagram illustrating an example of a data processing system capable of configuring a surrogate memory accessing agent using an instruction capable of being processed by a processor operating in a non-privileged or privileged mode according to certain embodiments.

Throughout the description, for the purposes of explanation, numerous specific details are set forth in order to provide a thorough understanding of the inventive concepts disclosed herein. It will be apparent, however, to one skilled in the art that the inventive concepts disclosed herein may be practiced without some of these specific details. In other instances, well-known structures and devices are shown in block diagram form to avoid obscuring the underlying principles of the inventive concepts disclosed herein.

Embodiments of the inventive concepts disclosed herein relate to data processing systems that can configure a surrogate memory accessing agent using an instruction capable of being processed by a processor operating in a non-privileged or privileged mode. The instruction may be an instruction for translating and storing data values to configure a surrogate memory accessing agent. A surrogate memory accessing agent can be configured when one or more data values are provided for storage in the surrogate memory accessing agent. The surrogate memory accessing agent may be any component or process that is capable of accessing physical memory directly on behalf of another component, such as a processor. An example of a surrogate memory accessing agent is a direct memory access (DMA) channel that is capable of moving or copying memory values from a first physical memory location to a second physical memory location, or accessing a memory value to perform a calculation or other purpose. The surrogate memory accessing agent can include one or more registers that each can store a data value specifying the location of a memory value in which to access.

An instruction can be received from a process and used to configure the surrogate memory accessing agent. The instruction can include a one operand specifying a data value representing a virtual address to be translated and another operand specifying a virtual address corresponding to a location of a register of the surrogate memory accessing agent. A processor, operating in a non-privileged or privileged mode, can process the instruction to cause the virtual address corresponding to the location of the register to be translated by a memory management unit (MMU), such as an MMU that includes a translation lookaside buffer (TLB), to a physical address of the register. The processor unit can cause the virtual address represented by the data value to be translated by the MMU to a physical address represented by the data value. The physical address represented by the data value can be stored in the register identified by the physical address of the register.

In some embodiments, the surrogate memory accessing agent can use the stored data value to access a memory value at a physical address represented by the data value, such as for performing a calculation on the memory value or otherwise. In one embodiment, the surrogate memory accessing agent includes two registers. Each of the two registers can be configured using instructions according to certain embodiments. After a data value is stored in each of the two registers, the surrogate memory accessing agent may cause a memory value in physical memory to be moved or copied using the stored data values. For example, the data value in the first register may be the physical address of the memory value to be copied or moved and the data value in the second register may be the physical address of the memory location to which the memory value is copied or moved.

Configuring surrogate memory accessing agents using instructions for translating and storing data values may increase processing speed, decrease delays, decrease power consumption, and/or otherwise provide for more efficient processing. FIG. 1 shows a general diagram of one embodiment of configuring a surrogate memory accessing agent using an instruction for translating and storing data values. A process 100, such as a software program, is in communication with a processor unit 102 and may be one or more user-level software processes controllable by a user instead of a supervisory-level process, which the user has limited to no ability to directly manipulate. The process 100 can provide an instruction that identifies virtual addresses that are translatable by an MMU 108, such as an MMU 108 with a TLB 110, into physical addresses for storage in a surrogate memory accessing agent 112. In the embodiment shown in FIG. 1, the surrogate memory accessing agent 112 is a separate component from MMU 108.

The process 100 can be configured to provide the instruction to the processor unit 102. The instruction can include a first operand specifying a first virtual address represented by a data value to be stored in a register of the surrogate memory accessing agent 112 and a second operand specifying a second virtual address associated with a location of the register. The processor unit 102 can use the instruction to cause the second virtual address to be provided from an address register 104 to the MMU 108 and the first virtual address to be provided from a data register 106 to the MMU 108. In accordance with the instruction, the processor unit 102 can cause the TLB 110 to translate the first virtual address to a first physical address represented by a data value to be stored in the register and translate the second virtual address to a second physical address corresponding to the location of the register. The second physical address can be used to store the first physical address in the register of the surrogate memory accessing agent 112.

The surrogate memory accessing agent 112 is able to access memory 114, which may be a memory device for storing data that is accessed by the processor unit 102 for subsequent processing. Memory 114 includes memory values stored at different physical addresses in memory 114. The physical addresses of locations in memory 114 where memory values can be stored are represented by PA1, PA2, and PAn. The surrogate memory accessing agent 112 can use the data value representing the first physical address to access a location in memory 114.

In one example, a memory value may be stored in memory 114 at a location corresponding to PA1 that needs to be moved to a location corresponding to PA2. The surrogate memory accessing agent 112 may include at least two registers, such that a data value representing a physical address corresponding to PA1 is stored in a first register and a data value representing a physical address corresponding to PA2 is stored in a second register. The data value in the first register can be used to identify the location (PA1) of the memory value to be moved or copied and the data value in the second register can be used to identify the location (PA2) to which the memory value is to be moved. The memory value can thus be moved from PA1 to PA2 using instructions for translating and storing data values that are processed by a processor operating in a non-privileged or privileged mode and avoiding processing inefficiencies.

Figure 2:
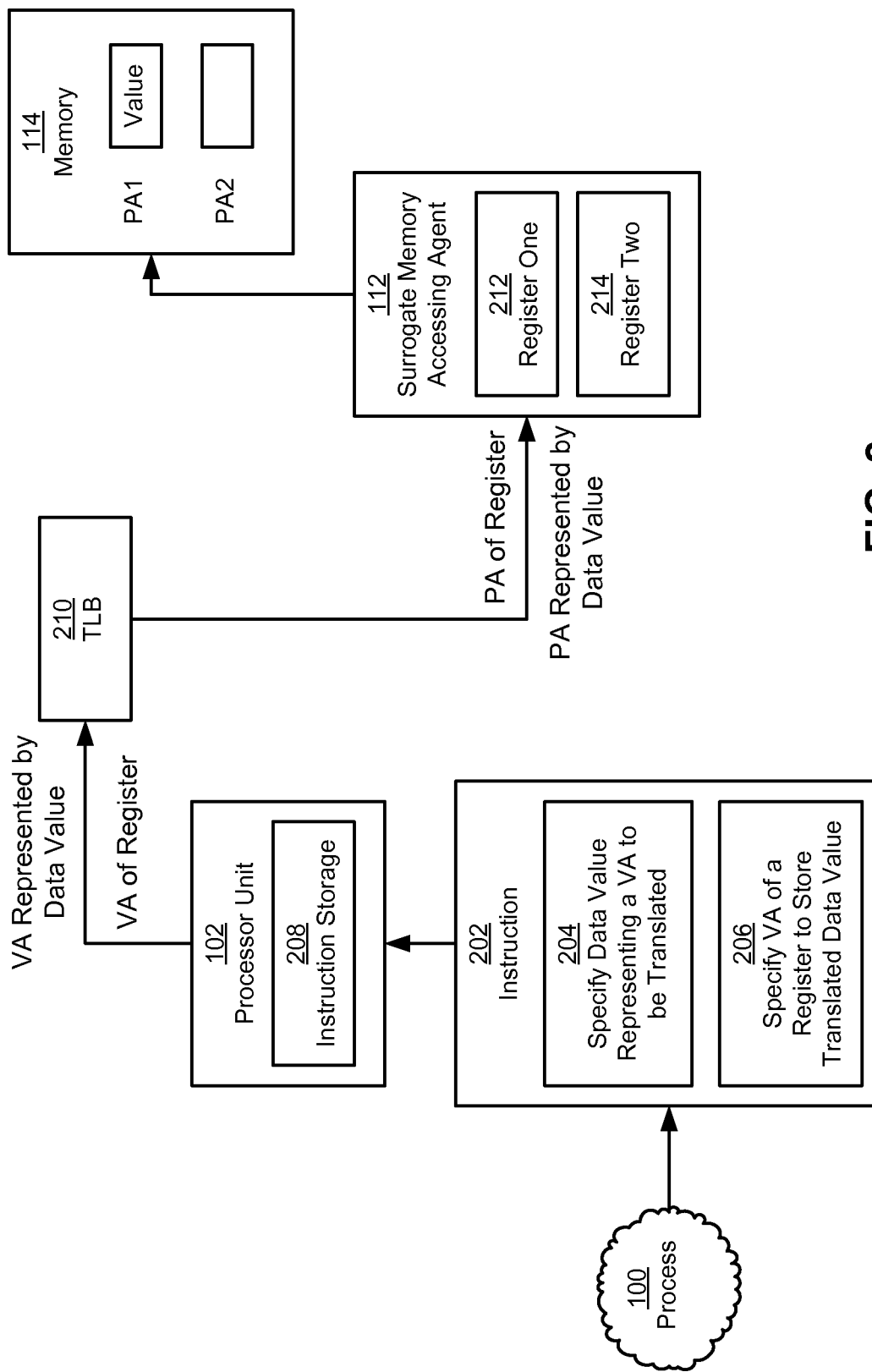
FIG. 2 is a general diagram illustrating an exemplary data processing system for configuring a surrogate memory accessing agent using an instruction capable of being processed by a processor operating in a non-privileged or privileged mode according to certain embodiments.

Various instructions for translating and storing data values can be used to configure surrogate memory accessing agents. FIG. 2 is a general diagram of an embodiment of a data processing system for configuring the surrogate memory accessing agent 112 using an instruction 202 provided by the process 100. The instruction 202 can include two operands: (a) specify data value representing a virtual address (VA) to be translated 204; and (b) specify a virtual address (VA) corresponding to the location of a register in which to store the translated data value 206. The virtual addresses may be specified by the process 100. In some embodiments, the instruction 202 includes an operand specifying the location of the virtual addresses in the processor unit 102 instead of the virtual addresses.

The processor unit 102 can be configured to store the instruction 202 in instruction storage 208. Instruction storage 208 may be a computer-readable medium in which the instruction 202 is stored for later use, processing, or access. The instruction 202 may be represented using any suitable programming code. For example, the first operand may be code for specifying a data value representing a virtual address to be translated to a physical address and the second operand may be code for specifying a virtual address associated with a location of a surrogate memory accessing agent register in which to store the physical address represented by the data value.

The processor unit 102 can process the instruction 202 upon receipt or at a later time by accessing the instruction storage 208. The processor unit 102 can process the instruction 202 by providing a virtual address specifying a location of a register in which to store the data value and providing the data value representing a second virtual address. The virtual address of the register may correspond to a register in the surrogate memory accessing agent 112. The processor unit 102, based on the instruction 202, can cause the virtual address specifying a location of the register and the virtual address represented by the data value to be translated by an MMU, such as an MMU including TLB 210.

The TLB 210 can translate the virtual address specifying the location of the register to a physical address (PA) of the register. For example, the TLB 210 may include a look-up table for determining the physical address associated with the virtual address specifying the location of the register. In addition, the TLB 210 translates the virtual address represented by the data value to a physical address (PA) represented by the data value. The TLB 210 can provide the translated physical addresses to the surrogate memory accessing agent 112.

The surrogate memory accessing agent 112 can include one or more registers for storing data values. In the embodiment shown in FIG. 2, the surrogate memory accessing agent 112 includes two registers: register one 212 and register two 214. The physical address of the register can be used to identify the register of the surrogate memory accessing agent 112 in which to store the data value. For example, the physical address of the register may be the physical address of register one 212. After identifying register one 212 using the physical address of the register, the data value representing a physical address is stored in register one 212.

In some embodiments, the processor unit 102 may receive a second instruction in which different virtual addresses are specified for translation and use for storing in register two 214. For example, a virtual address may be identified that is associated with a location corresponding to register two 214. A data value representing another virtual address, different than in the first instruction 202, to be translated can be specified. The processor unit 102 can process the second instruction, generally in accordance with the process and components described above, and cause a physical address represented by the data value identified by the second instruction to be stored in register two 214. The surrogate memory accessing agent 112 can use the data values stored in register one 212 and register two 214 to access memory 114.

Memory 114 may be a physical memory in which data is stored and accessed for processing. The memory 114 shown in FIG. 2 includes a memory value stored at a location having a physical address of PA1 and includes a second location having a physical address of PA2 that is open (i.e. a memory value is not stored in that location). Memory 114 is provided for illustrative purposes. Other memory devices can include additional memory locations associated with physical addresses in which values are stored or capable of being stored.

Figure 3:
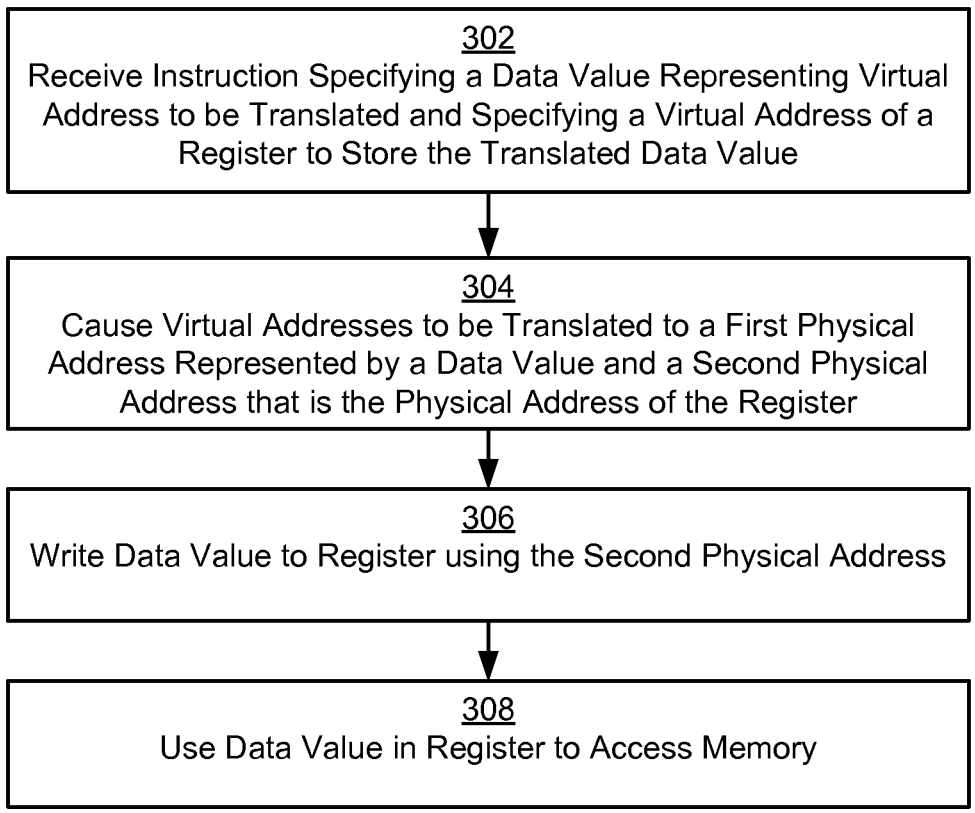
FIG. 3 is a flow chart illustrating an exemplary process for configuring a surrogate memory accessing agent using an instruction capable of being processed by a processor operating in a non-privileged or privileged mode according to certain embodiments.

Instructions according to various embodiments can be used to configure a surrogate memory accessing agents by storing a translated data value representing a physical address in one or more registers. FIG. 3 illustrates a method for configuring a surrogate memory accessing agent using an instruction for translating and storing a data value. The flow diagram of FIG. 3 is described with reference to the components and instructions illustrated in FIG. 2. However, other implementations are possible.

The method begins in block 302 when the processor unit 102 receives an instruction specifying a data value representing a virtual address to be translated and specifying a virtual address of a register to store the translated data value. The instruction can be received from a process, such as software operating in user mode. The operand specifying a virtual address of a register may include the virtual address corresponding to the physical address of register one 212 of the surrogate memory accessing agent 112. The processor unit 102 is configured to process the instruction. For example, the processor unit 102 can store the instruction in a computer-readable medium, such as instruction storage 208, and perform the operations specified by the instruction.

In block 304, the processor unit 102 causes the virtual addresses to be translated by the TLB 210 into physical addresses. The processor unit 102 can provide a virtual address of a location corresponding to register one 212 and a data value representing another virtual address to the TLB 210 and cause the TLB 210 to translate the virtual addresses. The TLB 210 can include a look-up table or other mechanism with which to determine the physical addresses associated with the virtual addresses. For example, the TLB 210 can use a look-up table to determine the physical address associated with the virtual address of a location corresponding to register one 212. The output of the TLB 210 can be a physical address of register one 212 and another physical address represented by a data value to be stored in register one 212. The physical address represented by the data value may correspond to a location in memory to be accessed by the surrogate memory accessing agent.

In block 306, the processor unit 102 writes the data value representing a physical address to register one 212 using the physical address of register one 212. For example, the physical address of register one 212 identifies the location to which the data value is written and the processor unit can cause the data value, representing a physical address translated from a virtual address provided by the process 100, to register one 212 based on the identification of register one 212 by its physical address.

In block 308, the surrogate memory accessing agent 112 can use the data value representing the physical address and stored in register one 212 to identify a location in memory 114 of a memory value to access. In some embodiments, the memory value can be accessed for purposes of performing a calculation on, or using, the memory value. For example, the physical address represented by the data value in register one 212 may correspond to PA1 of memory 114 identifying it as a location of a memory value to be accessed for calculation or other purposes.

The method shown in FIG. 3 is directed to configuring a register of a surrogate memory accessing agent using an instruction for translating and storing a data value. However, additional registers can be configured in a similar way using a second instruction, or an instruction via another method, and the surrogate memory accessing agent can use more than one data value stored in its registers to access memory values in memory, such as for purposes of moving or copying memory values.

Figure 4:
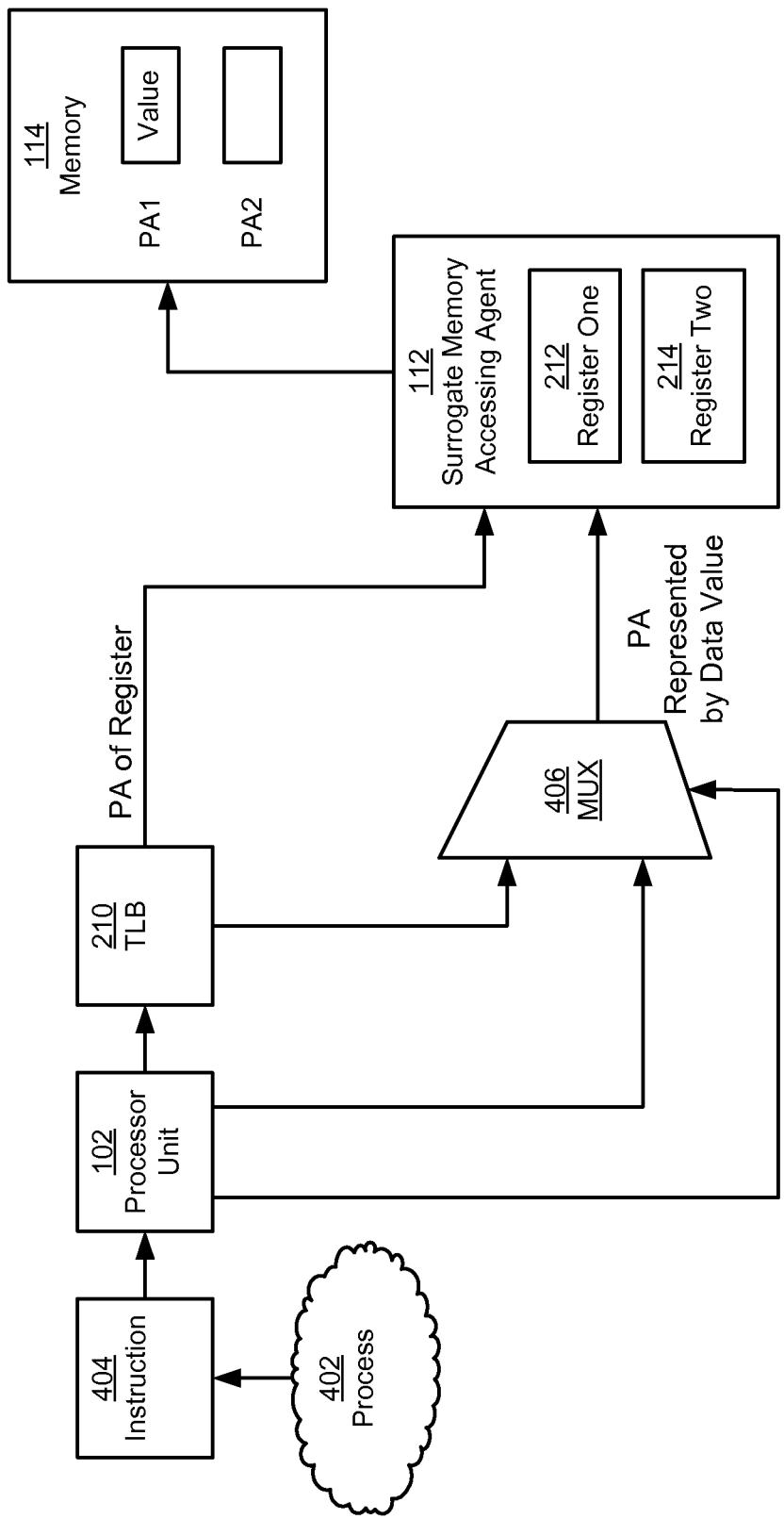
FIG. 4 is a general diagram of a second exemplary data processing system for configuring a surrogate memory accessing agent using an instruction capable of being processed by a processor operating in a non-privileged or privileged mode according to certain embodiments.

Processing systems for configuring surrogate memory accessing agents according to some embodiments may be adapted to use instructions for translating and storing data values, or other types of instructions. FIG. 4 is a general diagram of a second embodiment of a processing system that can configure the surrogate memory accessing agent 112 using instructions for translating and storing data values, or other types of instructions, such as instructions that are not capable of being processed by processors operating in a non-privileged mode.

An instruction 404 is provided by a process 402. The process 402 may be a user-mode process capable of providing an instruction specifying virtual addresses or a supervisory-level process capable of providing an instruction specifying virtual address or physical addresses. If the instruction 404 specifies virtual addresses, the instruction 404 can include one operand specifying a virtual address represented by a data value to be translated and a second operand specifying a second virtual address that is associated with a location of a register of the surrogate memory accessing agent 112 in which to store the translated data value, as described for example with reference to FIGS. 1-3.

In other embodiments, the instruction 404 is from a supervisory-level process that specifies physical addresses, including a data value representing a physical address and a virtual address associated with a location of the register of the surrogate memory accessing agent 112 in which to store the data value. When the instruction 404 specifies the physical address represented by the data value, the processor unit 102 can provide the data value representing the physical address to a multiplexer (MUX) 406 as an input. The processor unit 102 can cause the virtual address to be translated by an MMU, such as a MMU including TLB 210, and to be provided to the surrogate memory accessing agent 112. The output of the TLB 210 may be the physical address associated with the register in which to store the data value provided by the processor unit 102.

The MUX 406 can be configured to determine whether to supply the input received from the TLB 210 or the input received from the processor unit 102 to the surrogate memory accessing agent 112. The processor unit 102 can also provide an output to the MUX 406 as a selector that is based on the type of instruction being executed. If the instruction specifies a data value representing a physical address, then the processor unit 102 outputs a selector to cause the MUX 406 to provide the data value from the processor unit 102. If the instruction specifies a data value representing a virtual address, then the TLB 210 translates the value and the processor unit 102 causes the MUX 406 to provide the translated value from TLB 210 to the surrogate memory accessing agent 112.

In the embodiment shown in FIG. 4, the surrogate memory accessing agent 112 can store data values in register one 212 and/or register two 214 received from the MUX 406 via one or more instructions. The surrogate memory accessing agent 112 can access the memory 114 when one or more of the registers 212, 214 include data values. For example, the data value stored in register one 212 may be used to identify a memory location corresponding to physical address PA1 as a location from which a memory value in memory 114 is to be moved or copied. The data value stored in register one 212 may be used to identify a memory location corresponding to physical address PA2 as a location to which the memory value is to be moved or copied. The surrogate memory accessing agent 112 can use the data values to cause the memory value to be moved or copied to the identified location.

Example Devices Including the Above Described Features

Processor units capable of configuring surrogate memory accessing agents using instructions for translating and storing data values may be included in any type of processor, such as digital signal processors. The general diagrams of FIGS. 5-9 illustrate example devices that may incorporate processor units for configuring surrogate memory accessing agents using instructions for translating and storing data values.

Figure 5:
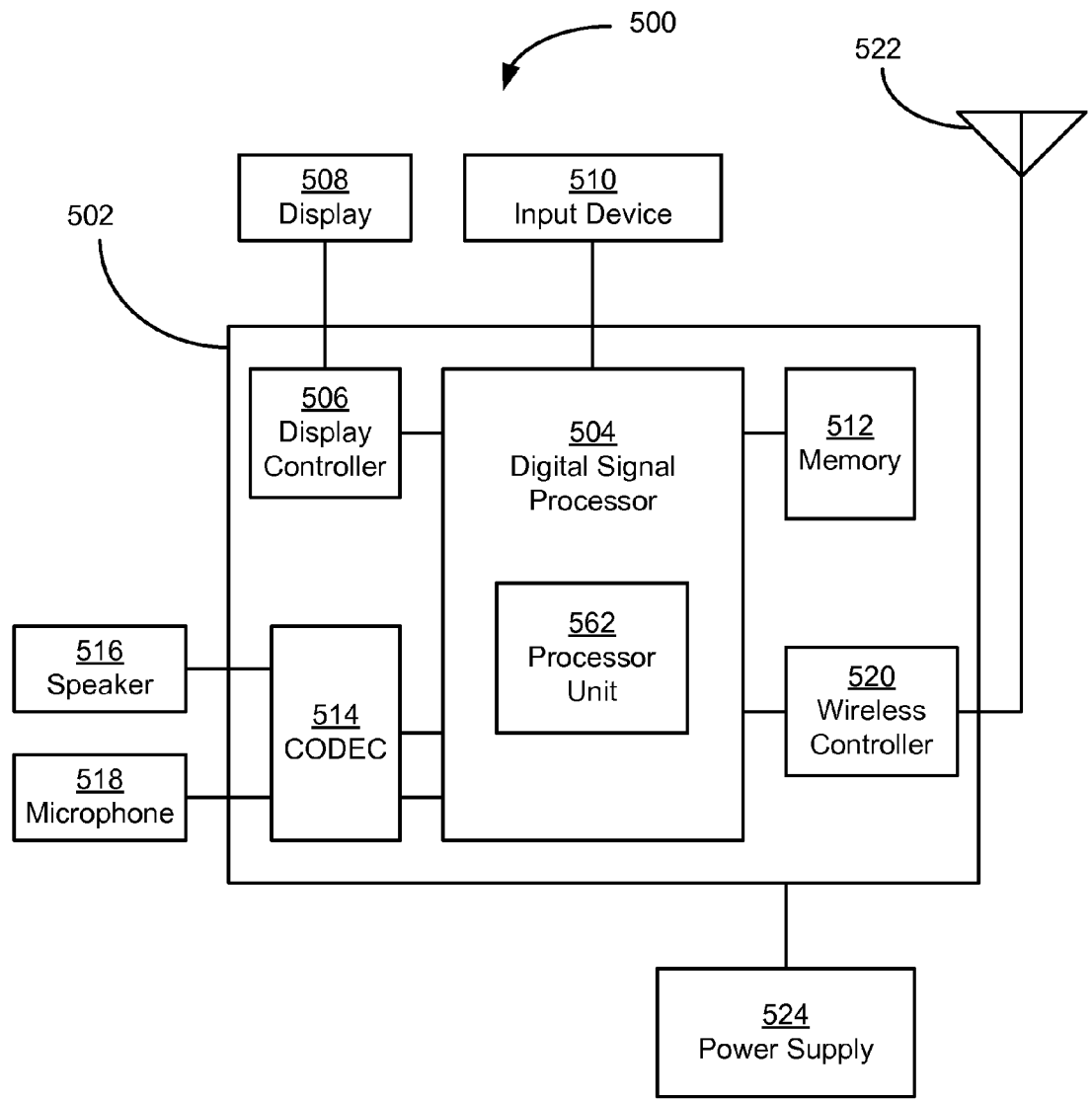
FIG. 5 is a general diagram illustrating an example portable communication device that may include a processor unit capable of configuring a surrogate memory accessing agent using an instruction according to certain embodiments.

FIG. 5 is a diagram illustrating an exemplary embodiment of a portable communication device 500. As illustrated in the general diagram of FIG. 5, the portable communication device includes an on-chip system 502 that includes a digital signal processor (DSP) 504. The general diagram of FIG. 5 also shows a display controller 506 that is coupled to the DSP 504 and a display 508. Moreover, an input device 510 is coupled to the DSP 504. As shown, a memory 512 is coupled to the DSP 504. Additionally, a coder/decoder (CODEC) 514 may be coupled to the DSP 504. A speaker 516 and a microphone 518 may be coupled to the CODEC 514.

The general diagram of FIG. 5 further illustrates a wireless controller 520 coupled to the digital signal processor 504 and a wireless antenna 522. In a particular embodiment, a power supply 524 is coupled to the on-chip system 502. The display 508, the input device 510, the speaker 516, the microphone 518, the wireless antenna 522, and the power supply 524 may be external to the on-chip system 502. However, each can be coupled to a component of the on-chip system 502.

In a particular embodiment, the DSP 504 includes a processor unit 562, examples of which are described with reference to FIG. 1, 2 or 4, that can configure a surrogate memory accessing agent, such as a DMA channel, using an instruction for translating and storing data values to decrease processing delays, power consumption, and/or otherwise provide more efficient processing. For example, the processor unit 562 can be configured to process an instruction that includes one operand specifying a virtual address associated with a location of a register of the surrogate memory accessing agent, and a second operand specifying a second virtual address represented by a data value to be translated into a physical address and stored in the register.

Figure 6:
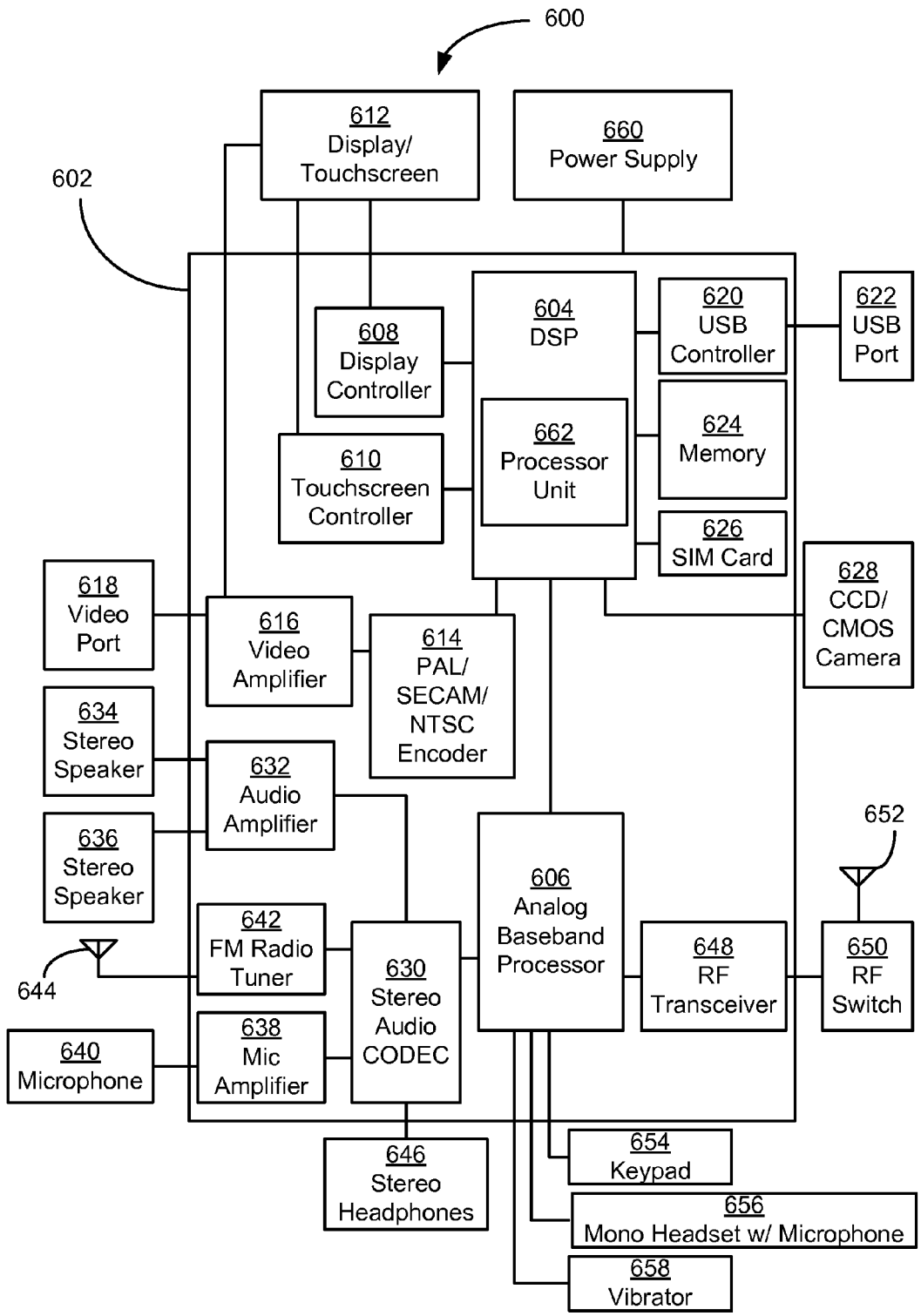
FIG. 6 is a general diagram illustrating an example cellular telephone that may include a processor unit capable of configuring a surrogate memory accessing agent using an instruction according to certain embodiments.

FIG. 6 is a diagram illustrating an exemplary embodiment of a cellular telephone 600. As shown, the cellular telephone 600 includes an on-chip system 602 that includes a digital baseband processor 604 and an analog baseband processor 606 that are coupled together. In a particular embodiment, the digital baseband processor 604 is a digital signal processor. As illustrated in the general diagram of FIG. 6, a display controller 608 and a touchscreen controller 610 are coupled to the digital baseband processor 604. In turn, a touchscreen display 612 external to the on-chip system 602 is coupled to the display controller 608 and the touchscreen controller 610.

The general diagram of FIG. 6 further illustrates a video encoder 614, e.g., a phase alternating line (PAL) encoder, a sequential couleur a memoire (SECAM) encoder, or a national television system(s) committee (NTSC) encoder, is coupled to the digital baseband processor 604. Further, a video amplifier 616 is coupled to the video encoder 614 and the touchscreen display 612. Also, a video port 618 is coupled to the video amplifier 616. A universal serial bus (USB) controller 620 is coupled to the digital baseband processor 604. Also, a USB port 622 is coupled to the USB controller 620. A memory 624 and a subscriber identity module (SIM)

card 626 may also be coupled to the digital baseband processor 604. Further, as shown in the general diagram of FIG. 6, a digital camera 628 may be coupled to the digital baseband processor 604. In an exemplary embodiment, the digital camera 628 is a charge-coupled device (CCD) camera or a complementary metal-oxide semiconductor (CMOS) camera.

As further illustrated in the general diagram of FIG. 6, a stereo audio CODEC 630 may be coupled to the analog baseband processor 606. Moreover, an audio amplifier 632 may be coupled to the stereo audio CODEC 630. In an exemplary embodiment, a first stereo speaker 634 and a second stereo speaker 636 are coupled to the audio amplifier 632. A microphone amplifier 638 may be also coupled to the stereo audio CODEC 630. Additionally, a microphone 640 may be coupled to the microphone amplifier 638. In a particular embodiment, a frequency modulation (FM) radio tuner 642 may be coupled to the stereo audio CODEC 630. An FM antenna 644 can be coupled to the FM radio tuner 642. Further, stereo headphones 646 may be coupled to the stereo audio CODEC 630.

The general diagram of FIG. 6 further illustrates a radio frequency (RF) transceiver 648 that may be coupled to the analog baseband processor 606. An RF switch 650 may be coupled to the RF transceiver 648 and an RF antenna 652. A keypad 654 may be coupled to the analog baseband processor 606. Also, a mono headset with a microphone 656 may be coupled to the analog baseband processor 606. Further, a vibrator device 658 may be coupled to the analog baseband processor 606. The general diagram of FIG. 6 also shows a power supply 660 that may be coupled to the on-chip system 602. In a particular embodiment, the power supply 660 is a direct current (DC) power supply that provides power to the various components of the cellular telephone 600. Further, in a particular embodiment, the power supply is a rechargeable DC battery or a DC power supply that is derived from an alternating current (AC) to DC transformer that is coupled to an AC power source.

As depicted in the general diagram of FIG. 6, the touchscreen display 612, the video port 618, the USB port 622, the camera 628, the first stereo speaker 634, the second stereo speaker 636, the microphone 640, the FM antenna 644, the stereo headphones 646, the RF switch 650, the RF antenna 652, the keypad 654, the mono headset with microphone 656, the vibrator 658, and the power supply 660 may be external to the on-chip system 602. In a particular embodiment, the DSP 604 includes a processor unit 662, examples of which are described with reference to FIG. 1, 2 or 4, that can configure a surrogate memory accessing agent, such as a DMA channel, using an instruction for translating and storing data values to decrease processing delays, power consumption, and/or otherwise provide more efficient processing. For example, the processor unit 662 can be configured to process an instruction that includes one operand specifying a virtual address associated with a location of a register of the surrogate memory accessing agent, and a second operand specifying a second virtual address represented by a data value to be translated into a physical address and stored in the register.

Figure 7:
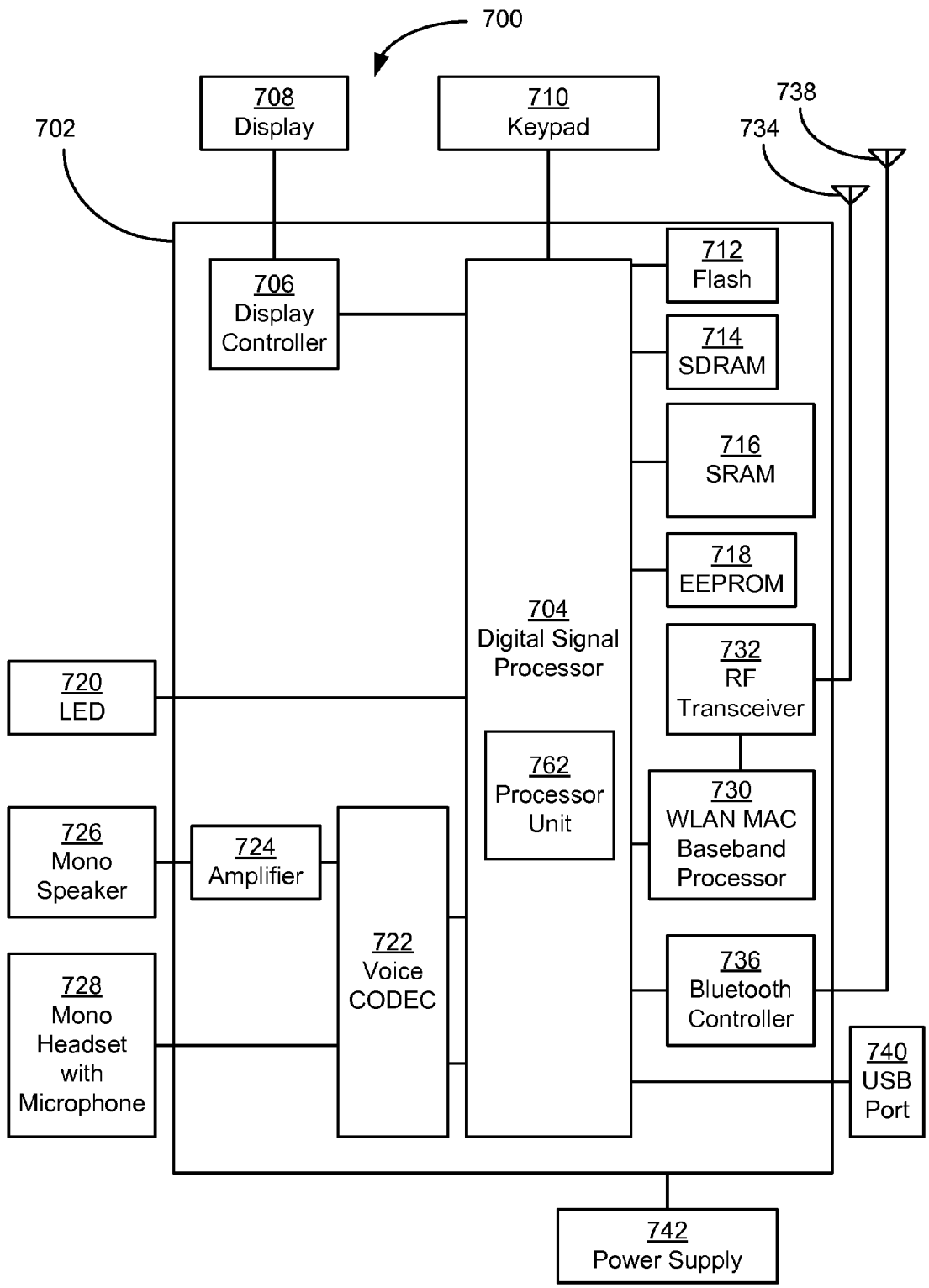
FIG. 7 is a general diagram illustrating an example wireless Internet Protocol telephone that may include a processor unit capable of configuring a surrogate memory accessing agent using an instruction according to certain embodiments.

FIG. 7 is a diagram illustrating an exemplary embodiment of a wireless Internet protocol (IP) telephone 700. As shown, the wireless IP telephone 700 includes an on-chip system 702 that includes a digital signal processor (DSP) 704. A display controller 706 may be coupled to the DSP 704 and a display 708 is coupled to the display controller 706. In an exemplary embodiment, the display 708 is a liquid crystal display (LCD). FIG. 7 further shows that a keypad 710 may be coupled to the DSP 704.

A flash memory 712 may be coupled to the DSP 704. A synchronous dynamic random access memory (SDRAM) 714, a static random access memory (SRAM) 716, and an electrically erasable programmable read only memory (EEPROM) 718 may also be coupled to the DSP 704. The general diagram of FIG. 7 also shows that a light emitting diode (LED) 720 may be coupled to the DSP 704. Additionally, in a particular embodiment, a voice CODEC 722 may be coupled to the DSP 704. An amplifier 724 may be coupled to the voice CODEC 722 and a mono speaker 726 may be coupled to the amplifier 724. The general diagram of FIG. 7 further illustrates a mono headset 728 coupled to the voice CODEC 722. In a particular embodiment, the mono headset 728 includes a microphone.

A wireless local area network (WLAN) baseband processor 730 may be coupled to the DSP 704. An RF transceiver 732 may be coupled to the WLAN baseband processor 730 and an RF antenna 734 may be coupled to the RF transceiver 732. In a particular embodiment, a Bluetooth controller 736 may also be coupled to the DSP 704 and a Bluetooth antenna 738 may be coupled to the controller 736. The general diagram of FIG. 7 also shows that a USB port 740 may also be coupled to the DSP 704. Moreover, a power supply 742 is coupled to the on-chip system 702 and provides power to the various components of the wireless IP telephone 700.

As indicated in the general diagram of FIG. 7, the display 708, the keypad 710, the LED 720, the mono speaker 726, the mono headset 728, the RF antenna 734, the Bluetooth antenna 738, the USB port 740, and the power supply 742 may be external to the on-chip system 702 and coupled to one or more components of the on-chip system 702. In a particular embodiment, the DSP 704 includes a processor unit 762, examples of which are described with reference to FIG. 1, 2 or 4, that can configure a surrogate memory accessing agent, such as a DMA channel, using an instruction for translating and storing data values to decrease processing delays, power consumption, and/or otherwise provide more efficient processing. For example, the processor unit 762 can be configured to process an instruction that includes one operand specifying a virtual address associated with a location of a register of the surrogate memory accessing agent, and a second operand specifying a second virtual address represented by a data value to be translated into a physical address and stored in the register.

Figure 8:
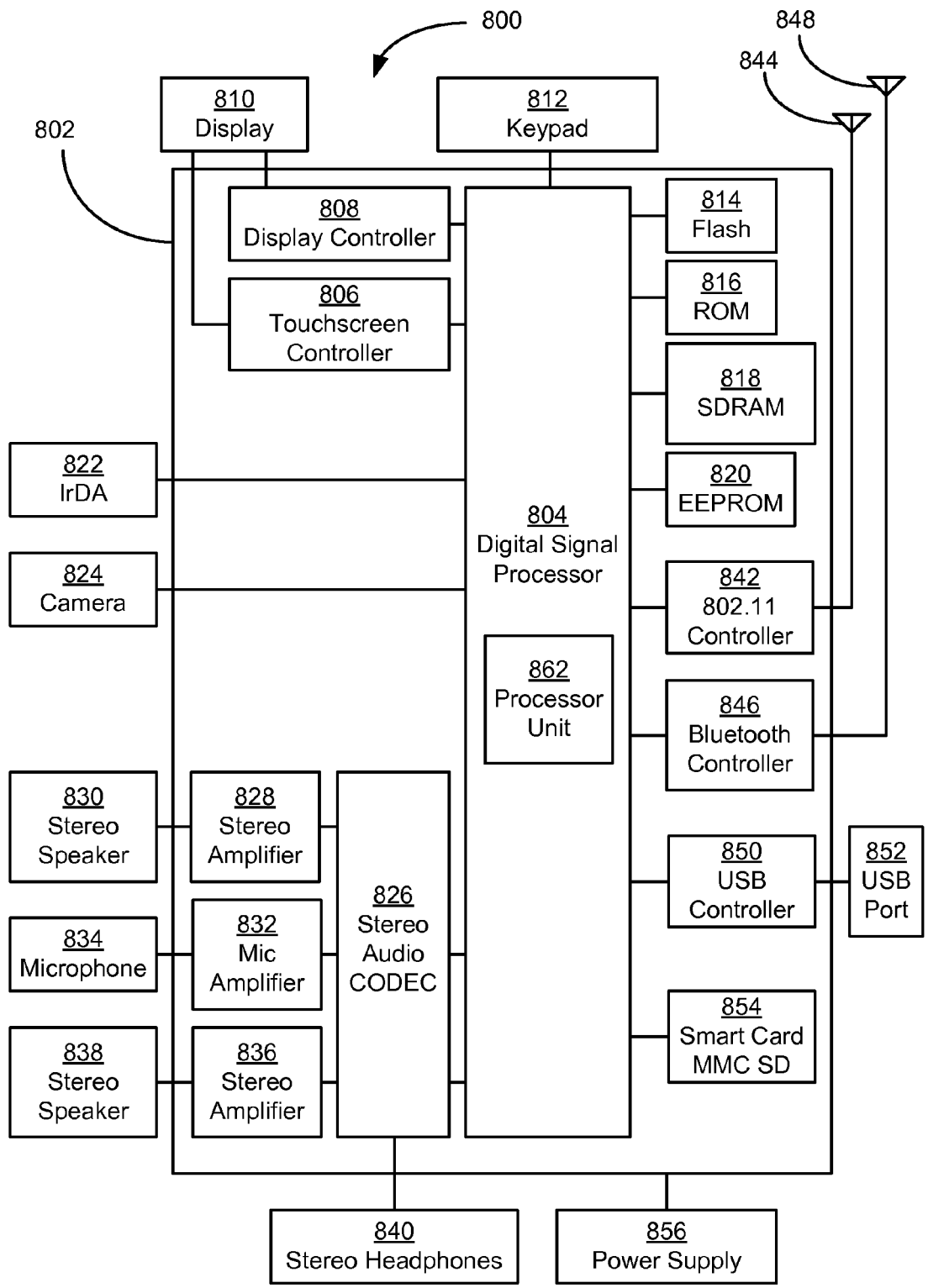
FIG. 8 is a general diagram illustrating an example portable digital assistant that may include a processor unit capable of configuring a surrogate memory accessing agent using an instruction according to certain embodiments.

FIG. 8 is a diagram illustrating an exemplary embodiment of a portable digital assistant (PDA) 800. As shown, the PDA 800 includes an on-chip system 802 that includes a digital signal processor (DSP) 804. A touchscreen controller 806 and a display controller 808 are coupled to the DSP 804. Further, a touchscreen display 810 is coupled to the touchscreen controller 806 and to the display controller 808. The general diagram of FIG. 8 also indicates that a keypad 812 may be coupled to the DSP 804.

In a particular embodiment, a stereo audio CODEC 826 may be coupled to the DSP 804. A first stereo amplifier 828 may be coupled to the stereo audio CODEC 826 and a first stereo speaker 830 may be coupled to the first stereo amplifier 828. Additionally, a microphone amplifier 832 may be coupled to the stereo audio CODEC 826 and a microphone 834 may be coupled to the microphone amplifier 832. The general diagram of FIG. 8 further shows a second stereo amplifier 836 that may be coupled to the stereo audio CODEC 826 and a second stereo speaker 838 that may be coupled to the second stereo amplifier 836. In a particular embodiment, stereo headphones 840 may also be coupled to the stereo audio CODEC 826.

The general diagram of FIG. 8 also illustrates an 802.11 controller 842 that may be coupled to the DSP 804 and an 802.11 antenna 844 that may be coupled to the 802.11 controller 842. Moreover, a Bluetooth controller 846 may be coupled to the DSP 804 and a Bluetooth antenna 848 may be coupled to the Bluetooth controller 846. A USB controller 850 may be coupled to the DSP 804 and a USB port 852 may be coupled to the USB controller 850. Additionally, a smart card 854, e.g., a multimedia card (MMC) or a secure digital card (SD), may be coupled to the DSP 804. Further, a power supply 856 may be coupled to the on-chip system 802 and may provide power to the various components of the PDA 800.

As indicated in the general diagram of FIG. 8, the display 810, the keypad 812, the IrDA port 822, the digital camera 824, the first stereo speaker 830, the microphone 834, the second stereo speaker 838, the stereo headphones 840, the 802.11 antenna 844, the Bluetooth antenna 848, the USB port 852, and the power supply 856 may be external to the on-chip system 802 and coupled to one or more components on the on-chip system 802. In a particular embodiment, the DSP 804 includes a processor unit 862, examples of which are described with reference to FIG. 1, 2 or 4, that can configure a surrogate memory accessing agent, such as a DMA channel, using an instruction for translating and storing data values to decrease processing delays, power consumption, and/or otherwise provide more efficient processing. For example, the processor unit 862 can be configured to process an instruction that includes one operand specifying a virtual address associated with a location of a register of the surrogate memory accessing agent, and a second operand specifying a second virtual address represented by a data value to be translated into a physical address and stored in the register.

Figure 9:
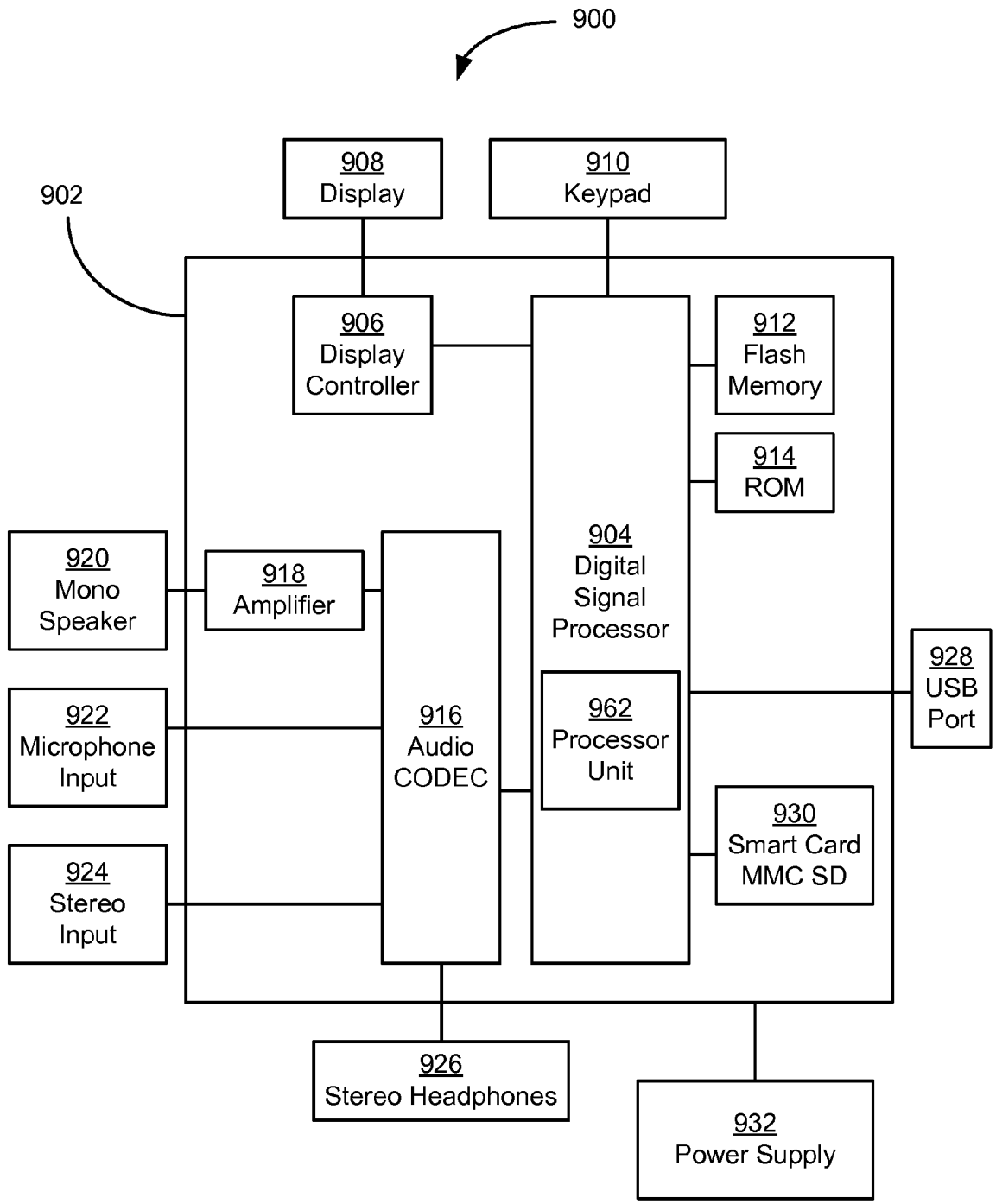
FIG. 9 is a general diagram illustrating an example audio file player that may include a processor unit capable of configuring a surrogate memory accessing agent using an instruction according to certain embodiments.

FIG. 9 is a diagram illustrating an exemplary embodiment of an audio file player (e.g., MP3 player) 900. As shown, the audio file player 900 includes an on-chip system 902 that includes a digital signal processor (DSP) 904. A display controller 906 may be coupled to the DSP 904 and a display 908 is coupled to the display controller 906. In an exemplary embodiment, the display 908 is a liquid crystal display (LCD). A keypad 910 may be coupled to the DSP 904.

As further depicted in the general diagram of FIG. 9, a flash memory 912 and a read only memory (ROM) 914 may be coupled to the DSP 904. Additionally, in a particular embodiment, an audio CODEC 916 may be coupled to the DSP 904. An amplifier 918 may be coupled to the audio CODEC 916 and a mono speaker 920 may be coupled to the amplifier 918. The general diagram of FIG. 9 further indicates that a microphone input 922 and a stereo input 924 may also be coupled to the audio CODEC 916. In a particular embodiment, stereo headphones 926 may also be coupled to the audio CODEC 916.

A USB port 928 and a smart card 930 may be coupled to the DSP 904. Additionally, a power supply 932 may be coupled to the on-chip system 902 and may provide power to the various components of the audio file player 900.

As indicated in the general diagram of FIG. 9 the display 908, the keypad 910, the mono speaker 920, the microphone input 922, the stereo input 924, the stereo headphones 926, the USB port 928, and the power supply 932 are external to the on-chip system 902 and coupled to one or more components on the on-chip system 902. In a particular embodiment, the DSP 904 includes a processor unit 962, examples of which are described with reference to FIG. 1, 2 or 4, that can configure a surrogate memory accessing agent, such as a DMA channel, using an instruction for translating and storing data values to decrease processing delays, power consumption, and/or otherwise provide more efficient processing. For example, the processor unit 962 can be configured to process an instruction that includes one operand specifying a virtual address associated with a location of a register of the surrogate memory accessing agent, and a second operand specifying a second virtual address represented by a data value to be translated into a physical address and stored in the register.

The foregoing description of the embodiments of the inventive concepts disclosed herein has been presented only for the purpose of illustration and description and is not intended to be exhaustive or to limit the inventive concepts disclosed herein to the precise forms disclosed. Numerous modifications and adaptations are apparent to those skilled in the art without departing from the spirit and scope of the inventive concepts disclosed herein.

What is claimed is:

1. A method comprising:
receiving an instruction comprising a first operand and a second operand, the first operand specifying a data value to be translated to a first physical address when a processor processes the instruction in non-privileged mode, the second operand specifying a virtual address associated with a location of a first register in a surrogate memory accessing agent when the processor processes the instruction in non-privileged mode, the first operand specifying the first physical address when the processor processes the instruction in privileged mode, and the second operand specifying a second physical address associated with the location of the first register in the surrogate memory accessing agent when the processor processes the instruction in privileged mode;
translating by a memory management unit the data value to the first physical address when the processor processes the instruction in non-privileged mode;
translating the virtual address by the memory management unit to the second physical address associated with the location of the first register in the surrogate memory accessing agent when the processor processes the instruction in non-privileged mode;
providing, when the processor processes the instruction in privileged mode, the first and second physical addresses as input to a multiplexer, where the multiplexer provides the input received from the processor to the surrogate memory accessing agent; and
storing the first physical address in the first register in the surrogate memory accessing agent associated with the second physical address.

2. The method of claim 1, further comprising:
receiving a second instruction comprising a third operand specifying a second data value to be translated to a third physical address, and a fourth operand specifying a second virtual address associated with a location of a second register in the surrogate memory accessing agent;
translating the second data value to the third physical address;
translating the second virtual address to a fourth physical address associated with the location of second register in the surrogate memory accessing agent;
storing the third physical address in the second register in the surrogate memory accessing agent associated with the fourth physical address;
identifying a location of a memory value associated with the first physical address; and
moving the memory value to a second location associated with the third physical address.

3. The method of claim 1, further comprising:
using the first physical address to manage a memory value stored at a physical memory location.

4. A processing system comprising:
a surrogate memory accessing agent;
a processor unit configured to process an instruction received from a process, the instruction comprising a first operand and a second operand, the first operand specifying a data value to be translated to a first physical address when the processor unit processes the instruction in non-privileged mode, the second operand specifying a virtual address associated with a location of a register in the surrogate memory accessing agent when the processor unit processes the instruction in non-privileged mode, the first operand specifying the first physical address when the processor unit processes the instruction in privileged mode, and the second operand specifying a second physical address associated with the location of the first register in the surrogate memory accessing agent when the processor unit processes the instruction in privileged mode;
a memory management unit configured to translate the data value to the first physical address when the processor processes the instruction in non-privileged mode and translate the virtual address to the second physical address associated with the location of the first register in the surrogate memory accessing agent when the processor processes the instruction in non-privileged mode;
a multiplexer having an input port coupled to the processor unit and an output port coupled to the surrogate memory accessing agent; and
wherein the processor unit is configured to provide, when the processor unit processes the instruction in privileged mode, the first and second physical addresses as input to the multiplexer, where the multiplexer provides the input received from the processor to the surrogate memory accessing agent, and to store the first physical address in the register in the surrogate memory accessing agent associated with the second physical address.

5. The processing system of claim 4, wherein the processing system is disposed in a portable communication device.

6. The processing system of claim 4, where the surrogate memory accessing agent is configured to use the first physical address to manage a memory value stored at a physical memory location.

7. The processing system of claim 6, wherein the surrogate memory accessing agent is a direct memory access (DMA) channel.

8. A processing system comprising:
a surrogate memory accessing agent;
a processor;
means for receiving an instruction comprising a first operand and a second operand, the first operand specifying a data value to be translated to a first physical address when the processor processes the instruction in non-privileged mode, the second operand specifying a virtual address associated with a location of a first register in the surrogate memory accessing agent when the processor processes the instruction in non-privileged mode, the first operand specifying a first physical address when the processor processes the instruction in privileged mode, and the second operand specifying a second physical address associated with the location of the first register in the surrogate memory accessing agent when the processor processes the instruction in privileged mode;
means for translating the data value to the first physical address when the processor processes the instruction in non-privileged mode;
means for translating the virtual address to the second physical address associated with the location of the first register in the surrogate memory accessing agent when the processor processes the instruction in non-privileged mode;
means for multiplexing, wherein when the processor processes the instruction in privileged mode, the processor provides the first and second physical addresses as input to the means for multiplexing, where the means for multiplexing provides the input received from the processor to the surrogate memory accessing agent; and
means for storing the first physical address in the first register in the surrogate memory accessing agent associated with the second physical address.

9. The processing system of claim 8, further comprising:
means for receiving a second instruction comprising a third operand specifying a second data value to be translated to a third physical address, and a fourth operand specifying a second virtual address associated with a location of a second register in the surrogate memory accessing agent;
means for translating the second data value to the third physical address;
means for translating the second virtual address to a fourth physical address associated with the location of second register in the surrogate memory accessing agent;
means for storing the third physical address in the second register in the surrogate memory accessing agent associated with the fourth physical address;
means for identifying a location of a memory value associated with the first physical address; and
means for moving the memory value to a second location associated with the third physical address.

* * * * *